(12) United States Patent
Erren et al.

(10) Patent No.: US 11,001,439 B2
(45) Date of Patent: May 11, 2021

(54) SEALED REUSABLE BULK MATERIAL CONTAINER

(71) Applicant: BASF SE, Ludwigshafen (DE)

(72) Inventors: Stefan Erren, Kallstadt (DE); Eberhard Beckmann, Neustadt (DE); Reinhard Schneider, Fussgönheim (DE); Dieter Schönhaber, Meckenheim (DE)

(73) Assignee: BASF SE, Ludwigshafen am Rhein (DE)

( * ) Notice: Subject to any disclaimer, the term of this patent is extended or adjusted under 35 U.S.C. 154(b) by 1 day.

(21) Appl. No.: 15/744,130

(22) PCT Filed: Jul. 8, 2016

(86) PCT No.: PCT/EP2016/066227
§ 371 (c)(1),
(2) Date: Jan. 12, 2018

(87) PCT Pub. No.: WO2017/009207
PCT Pub. Date: Jan. 19, 2017

(65) Prior Publication Data
US 2018/0208394 A1    Jul. 26, 2018

(30) Foreign Application Priority Data

Jul. 15, 2015  (EP) ..................... 15176836

(51) Int. Cl.
*B65D 90/54* (2006.01)
*B65D 90/58* (2006.01)
(52) U.S. Cl.
CPC ......... *B65D 90/545* (2013.01); *B65D 90/582* (2013.01); *B65D 2588/125* (2013.01); *Y02W 30/80* (2015.05)

(58) Field of Classification Search
CPC ................ B65D 90/545; B65D 90/582; B65D 2588/125; B65D 41/0414; B65D 41/0421;
(Continued)

(56) References Cited

U.S. PATENT DOCUMENTS 3,322,469 A * 5/1967 Fritz ..................... B61D 5/006
406/131
3,778,114 A 12/1973 Carney, Jr. et al.
(Continued)

FOREIGN PATENT DOCUMENTS

DE   7608706 U1   7/1977
FR   2070992 A5   9/1971

OTHER PUBLICATIONS

U.S. Appl. No. 15/128,755, filed Sep. 23, 2016.
(Continued)

*Primary Examiner* — Michael R Reid
(74) *Attorney, Agent, or Firm* — Faegre Drinker Biddle & Reath LLP

(57) ABSTRACT

The present invention relates to a container for holding bulk material, having a closable inlet for the bulk material in the upper closure of the container, a cross-sectional geometry narrowing in the outlet direction for the bulk material, an outlet tube for the bulk material arranged subsequently in the outlet direction, a first reversible mechanical closure device (A), which is arranged in the transition region from the container body to the outlet tube or in the outlet tube itself and, by opening, releases the bulk material from the interior of the container, and a second closure device (B) which reversibly closes the mouth of the outlet tube, the second closure device being a cover which is pressed flush onto the mouth of the outlet tube by means of a closure device, there being a seal which seals the outlet tube in a gas- and liquid-tight fashion from the external environment at least on the contact surface of the cover with the mouth degree of (Continued)

the outlet tube, wherein the cover is screwed onto or is pressed with a clamping ring or a bayonet closure onto the mouth of the outlet tube.

17 Claims, 4 Drawing Sheets

(58) Field of Classification Search
CPC .. B65D 41/0478; B65D 41/06; B65D 41/065; Y10T 137/7062; Y10T 137/7065
USPC .......................................... 220/727, 724, 726
See application file for complete search history.

(56) References Cited

U.S. PATENT DOCUMENTS

| | | | | |
|---|---|---|---|---|
| 4,697,528 | A | * | 10/1987 | Rehbein .................. B61D 5/08 105/358 |
| 5,232,115 | A | * | 8/1993 | Bauer ................ B60K 15/0406 220/259.3 |
| 6,263,802 | B1 | | 7/2001 | Burian et al. |

OTHER PUBLICATIONS

U.S. Appl. No. 15/569,792, filed Oct. 27, 2017.
European Search Report for European Application No. EP 15176836.3, dated Nov. 6, 2015.
International Search Report for PCT/EP2016/066227 dated Aug. 16, 2016.
Written Opinion of the International Searching Authority for PCT/EP2016/066227 dated Aug. 16, 2016.

\* cited by examiner

PRIOR ART

SEALED REUSABLE BULK MATERIAL CONTAINER

CROSS-REFERENCE TO RELATED APPLICATIONS

This application is a national stage application (under 35 U.S.C. § 371) of PCT/EP2016/066227, filed Jul. 8, 2016, which claims benefit of European Application No. 15176836.3, filed Jul. 15, 2015, both of which are incorporated herein by reference in their entirety.

The present invention relates to a container for holding bulk material and to the use of such a container for transporting air- and/or moisture-sensitive bulk materials, respectively as defined in the claims.

Containers in a wide variety of configurations for holding bulk material are known. They are usually rigid or flexible (for example so-called big bags) and are made of various materials, for example metal, for example steel or stainless steel, aluminum or plastic, for example polypropylene, HD or LD polyethylene, or polyamide.

One example of such containers are cylindrical or rectangular containers tapering conically downward to a closable outlet with a subsequent short outlet tube for the bulk material, which are for example made of steel and usually have a volume of from 0.5 to 5 m$^3$. These containers are referred to in the field and in the present application as intermediate bulk containers or IBCs. They are generally employed as multiuse containers, for example for the dispatch of flowable chemicals.

The outlet, usually on the bottom side, for emptying such IBCs with the least possible residue is generally opened and reclosed by means of reversible opening and closure devices, for example rotary valves, flat slide valves or pinch valves. Such opening and closure devices have the disadvantage that, in particular after frequent opening and closure, because of wear, bending or the like they no longer close so tightly that, for example, outside air cannot enter the interior of the IBC. The ingress of, for example, outside air into the IBC may, particularly in the case of bulk materials sensitive to oxygen and/or water, lead to decomposition or quality reduction of the bulk material held in the IBC, which is undesirable and furthermore entails a high hazard potential, particularly during transport.

The object of the present invention was therefore to provide a container, preferably a multiuse container, for holding preferably oxygen- and/or water-sensitive bulk materials, the bulk material outlet of which can be closed reversibly and substantially in a gas- and liquid-tight fashion.

The object has been achieved according to the container defined in the claims (here referred to as the container according to the invention) and the use defined in the claims.

THE DRAWINGS

DETAILED DESCRIPTION

Figure 1:
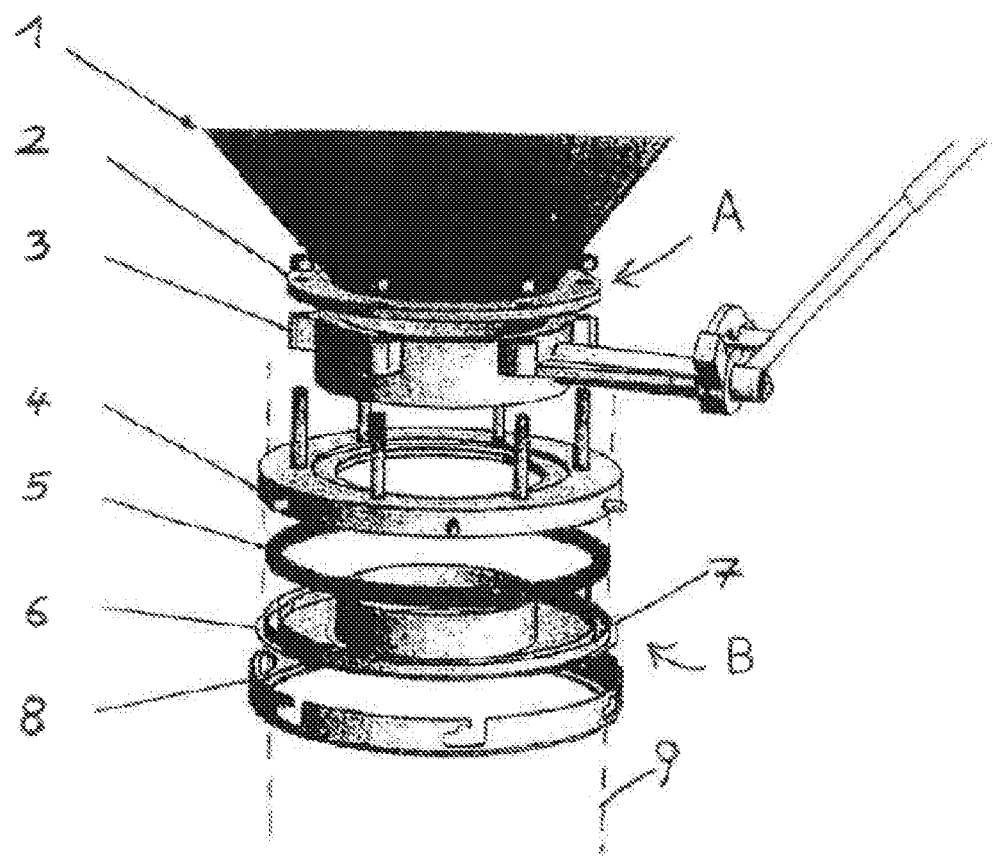
FIG. 1 is an exploded view of a container in accordance with this invention.

FIG. 1 illustrates the various components of the container of this invention. As shown therein part of the container body 1 is disposed above closure flange 2 which is above outlet tube closure 3. Continuing in the discharge direction, there is shown mouth edge strip flange 4. Seal 5 is located above cover 6. FIG. 1 also illustrates cover edge strip 7 and bayonet closure 8. The outlet tube 9 is shown in phantom.

Figure 2:
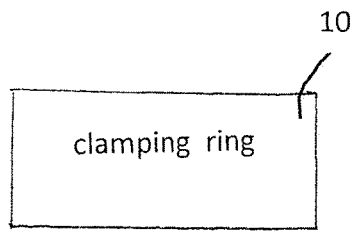
FIG. 2 is a labeled representation of a conventional prior art clamping ring.

FIG. 2 shows a conventional prior art clamping ring 10 which could be used instead of bayonet closure 8.

Figure 3:
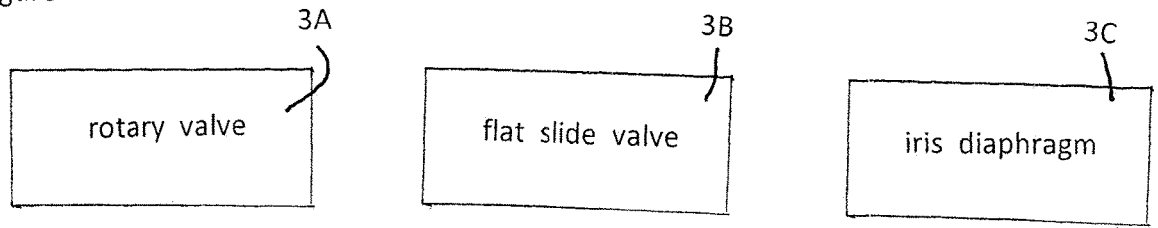
FIG. 3 are labeled representations of mechanical closure devices, namely a conventional prior art rotary valve and flat slide valve and iris diaphragm.

FIG. 3 illustrates conventional prior art mechanical closure devices, namely rotary valve 3A, iris diaphragm 3C and flat slide valve 3B.

The container according to the invention, in particular the main body, may have a rectangular, elliptical or round cross-sectional geometry, although it preferably has a round or rectangular cross-sectional geometry. The cross-sectional geometry of the container according to the invention narrows in the outlet direction for the bulk material in such a way that, for example for a container according to the invention with a round or rectangular cross-sectional geometry of the main body, it results in a container according to the invention tapering downward conically or quasi-conically.

In the upper closure of the container according to the invention, which usually lies opposite the outlet for the bulk material, there is an inlet which can be closed, preferably with a cover as a screw closure, for the bulk material.

Following on in the outlet direction for the bulk material in the part of the container according to the invention narrowing in the outlet direction, preferably substantially concentrically, there is an outlet tube for the bulk material, which conventionally has the same cross-sectional geometry as the main body of the container according to the invention narrowing in the outlet direction, and the outlet tube preferably has a round or rectangular cross-sectional geometry.

Arranged in the transition region from the container body to the outlet tube for the bulk material and/or in the outlet tube for the bulk material itself, preferably in the transition region from the container body to the outlet tube of the container according to the invention, there is a first reversible mechanical closure device (A), which by opening releases the bulk material from the interior of the container according to the invention and by closing retains the bulk material in the interior of the container according to the invention.

The first reversible mechanical closure device (A) is one which is conventional in the field for such purposes, for example the closure device 3 may be a rotary valve 3A, flat slide valve 3B, iris diaphragm 3C, preferably a rotary valve. A plurality of these closure devices (A), which may differ, may also be arranged in succession.

The closure device (A) is preferably a rotary valve 3A which is fully coated on its edges with material that, when the rotary valve 3A is closed, bears flush on the inner surface in the transition region from the container body to the outlet tube 9 or on the inner surface of the outlet tube, and when the rotary valve 3A is closed makes air or liquid access to the interior of the body according to the invention more difficult but usually does not reliably prevent it. Such a material is for example hard rubber. The actuation of the rotary valve 3A is conventionally carried out by hand, for example by a rotary wheel, or by means of an e.g. pneumatic drive.

The second closure device (B) reversibly closes the mouth of the outlet tube 9 having a preferably round cross-sectional geometry. The second closure device (B) is a cover 6 with usually the same cross-sectional geometry as the outlet tube 9, preferably a round cross-sectional geometry. This preferably round cover 6 is pressed flush onto the preferably round mouth of the outlet tube 9, there being a seal 5 at least on the contact surface of the preferably round cover 6 with the preferably round opening edge of the outlet tube 9, so that the mouth of the preferably round outlet tube 9 is sealed in a gas- and liquid-tight fashion from the external environment by the preferably round cover which is pressed on. The diameter of the preferably round cover 6 is conventionally equal to the outer diameter of the preferably round outlet tube 9, or slightly greater, depending on the specific configuration of the cover 6.

The cover is conventionally made of metal, for example steel, stainless steel or aluminum, or plastic, for example polypropylene, polyethylene such as HDPE or LDPE, polyamide, polyester or polyvinyl chloride. The cover is preferably made of metal, particularly preferably steel or stainless steel.

The seal is conventionally made of a deformable or preferably resilient plastic conventionally resistant to chemicals, such as rubber, neoprene, silicone, polyurethane, although it may also configured to be inflatable, for example in the manner of a hose. Highly suitable as materials for the seal are materials which are substantially chemically inert in relation to the bulk material, for example those mentioned above.

The closure or closing device for the preferably round cover 6 is a clamping ring 10 conventionally used for this purpose, made for example of metal or plastic, preferably metal such as steel or aluminum, preferably in each case with a lever closure. The closure or closing device for the preferably round cover 6 may likewise be a bayonet closure device 8 made for example of metal or plastic, preferably metal such as steel or aluminum, the person skilled in the art understanding bayonet closure is conventionally a closure which is locked by a rotary movement or an insertion and rotary movement. The preferably round cover 6 functioning as a closure device (B) may also be screwed on.

As a material for the container according to the invention as a whole, or parts thereof, metals, preferably steel, stainless steel, aluminum, plastic, preferably rigid thermoplastic or thermoset, optionally reinforced with additives, plastics such as polypropylene, polyethylene such as HDPE or LDPE, polyamide, polyester or polyvinyl chloride may be envisioned, preferably steel, stainless steel or aluminum.

A preferred embodiment of the second closure device (B) is as follows. A round cover 6 has a convexly curved cover edge strip 7, the concavity of the cover edge strip receiving the aforementioned seal 5. Furthermore, in this preferred embodiment the outlet tube 9, which is round in cross section, has a mouth edge strip or flange 4. The closure device for the round cover 6 in this embodiment is a clamping ring 10 conventionally used for this purpose, for example made of metal or plastic, preferably metal such as steel or aluminum, preferably in each case with a lever closure. In the firm connection of the cover 6 to the mouth edge of the outlet tube 9 carried out by means of the clamping ring 10, the seal 5 of the cover edge strip 7 bears so firmly on the mouth edge strip 4 that the cover 6 substantially closes the outlet tube 9 in a gas- and liquid-tight fashion.

A particularly preferred embodiment of the second closure device (B) will be described below and is represented as an exemplary embodiment in FIG. 1 together with an exemplary embodiment of the closure device 3 (A) and a part of the container body 1. A round cover 6 has a convexly curved cover edge strip, the concavity of the cover edge strip 7 receiving the aforementioned seal 5. Furthermore, in this particularly preferred embodiment the outlet tube 9, which is round in cross section, has a mouth edge strip (flange) 4. The closure or closing device for the round cover 6 is, in this particularly preferred embodiment, a bayonet closure 8 made for example of metal or plastic, preferably metal such as steel or aluminum. In the firm connection of the cover 6 to the mouth edge of the outlet tube 9 carried out by means of a bayonet closure 8, the seal 5 of the cover edge strip 7 bears so firmly on the mouth edge strip 4 that the cover 6 substantially closes the outlet tube 9 in a gas- and liquid-tight fashion.

A particularly preferred embodiment of the second closure device (B) will be described below and is represented as an exemplary embodiment in FIG. 1 together with an exemplary embodiment of the closure device (A) and a part of the container body. A round cover has a convexly curved cover edge strip, the concavity of the cover edge strip receiving the aforementioned seal. Furthermore, in this particularly preferred embodiment the outlet tube, which is round in cross section, has a mouth edge strip. The closure device for the round cover is, in this particularly preferred embodiment, a bayonet closure made for example of metal or plastic, preferably metal such as steel or aluminum. In the firm connection of the cover to the mouth edge of the outlet tube carried out by means of a bayonet closure, the seal of the cover edge strip bears so firmly on the mouth edge strip that the cover substantially closes the outlet tube in a gas- and liquid-tight fashion.

Here, the expression gas- and liquid-tight is intended to mean that the closure device (B) lets through substantially no gas or liquid under normal conditions, for example at temperatures of from −30 to 70° C. and 1 atm(abs).

Conventionally, the volume of the container according to the invention that can be filled with bulk material lies in the range of From 0.5 to 5 m$^3$, preferably in the range of from 1 to 2 m$^3$. Nevertheless, containers with a volume larger or smaller than this may also be envisioned.

Preferably, the container according to the invention is a multiuse container, which means inter alia that after emptying and sending back, can be refilled, transported and emptied again, and the cycles can be repeated. The container according to the invention may, however, also be employed as a single-use or disposable container.

In one highly suitable embodiment, the container according to the invention is mounted, preferably centrally, in a preferably metal framework such as a wire cage, or preferably tube frame or metal profile frame, the geometrical configuration of the framework conventionally being rectangular, for example cuboid or cubic.

Figure 4:
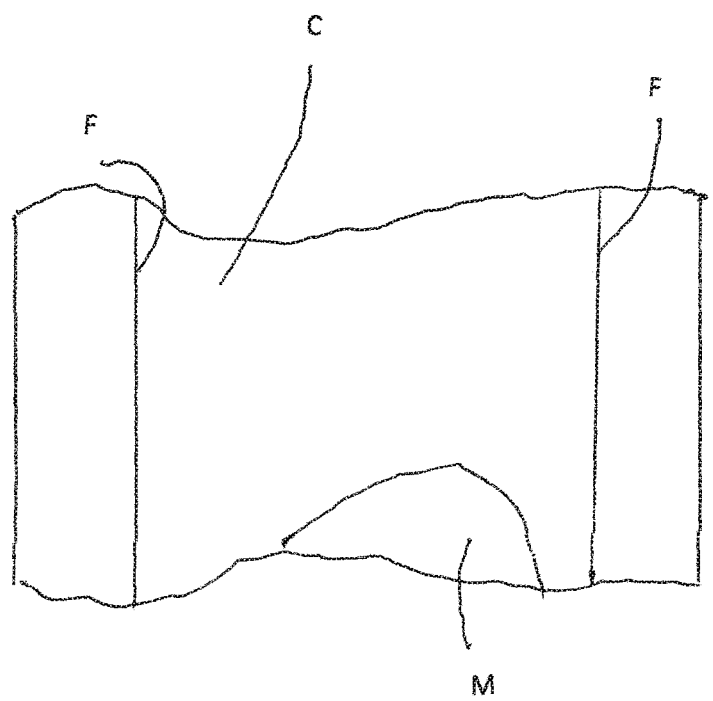
FIGS. 4a-4c are labeled representations of conventional prior art intermediate bulk containers.
Figure 4A:
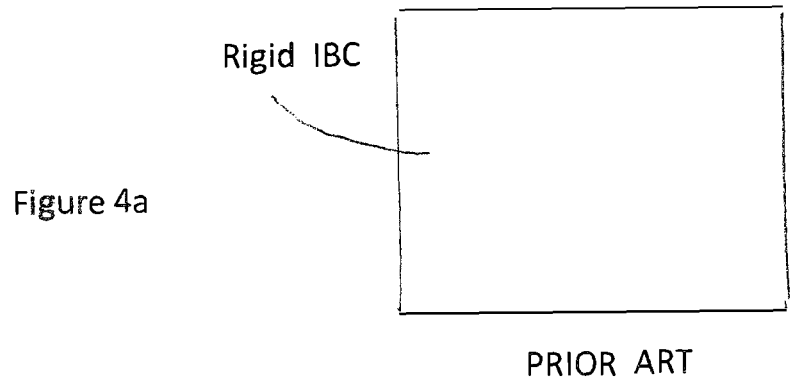
Figure 4B:
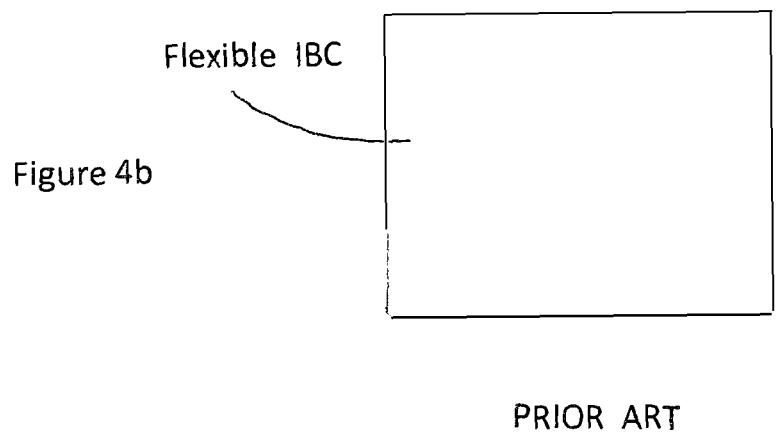
Figure 4C:
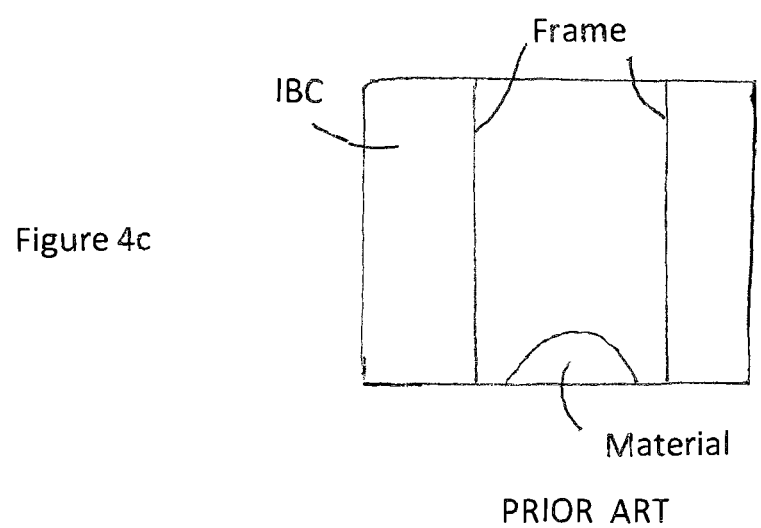

FIG. 4a shows a labeled representation of a prior art conventional rigid intermediate bulk container IBC. FIG. 4b shows a labeled representation of a prior art conventional flexible intermediate bulk container IBC. FIG. 4c shows a labeled representation of a prior art conventional intermediate bulk container IBC mounted in a frame. The IBC is partly broken away to illustrate the material within the IBC.

As bulk material with which the container according to the invention may be filled, all solids which can flow out through the outlet tube of the container according to the invention may be envisioned. Such bulk materials conventionally have an average particle size in the range of from 0.01 to 10 mm, preferably from 0.1 to 2 mm in relation to their longest diameter.

The container according to the invention is particularly highly suitable for bulk materials which are decomposed at least partly by the effect of oxygen, for example air, and/or water, for example the humidity, or the decomposition of which can be initiated by the effect of oxygen, for example air, and/or water, for example humidity. Such bulk materials are for example aluminum chloride, or those which are contained in dangerous goods class 4 (Model Regulations of the UN Recommendations on the Transport of Dangerous Goods, Revision 18 (2013)), such as water-reactive metal powder, alkali metal or alkaline-earth metal hydrides, alcoholates, borohydrides, salts of dithionous acid ($H_2S_2O_4$), such as sodium dithionite ($Na_2S_2O_4$).

Bulk materials with which the container according to the invention may particularly preferably be filled are, for example, salts of dithionous acid $H_2S_2O_4$, such as the alkali metal salts, preferably lithium, sodium and potassium salts, or the alkaline-earth metal salts, preferably calcium and magnesium salts of dithionous acid, or mixtures thereof, the forms with water of crystallization or similar adducts being of course included. Sodium dithionite ($Na_2S_2O_4$) is particularly preferred, the forms with water of crystallization or similar adducts being of course included. Of course, any other compositions comprising one or more of the aforementioned compounds of dithionous acid, preferably sodium dithionite ($Na_2S_2O_4$), are also included as suitable bulk materials.

The present invention also relates to the use of the container according to the invention as defined here for storing and transporting bulk material described here, including all preferred embodiments, described bulk material, preferably a bulk material which is a dangerous substance liable to spontaneous combustion of class 4 according to the Model Regulations of the UN Recommendations on the Transport of Dangerous Goods, Revision 18 (2013). Particularly preferred bulk materials of this type are salts of dithionous acid $H_2S_2O_4$, such as the alkali metal salts, preferably lithium, sodium and potassium salts, or the alkaline-earth metal salts, preferably calcium and magnesium salts of dithionous acid, or mixtures thereof, the forms with water of crystallization or similar adducts being of course included.

Particularly preferred is the use of the container according to the invention defined here for storing and/or transporting sodium dithionite ($Na_2S_2O_4$), the forms with water of crystallization or similar adducts being of course included.

Furthermore, the use of the container according to the invention defined here for storing and/or transporting compositions containing one or more of the aforementioned compounds of dithionous acid, preferably sodium dithionite ($Na_2S_2O_4$), are also included as suitable bulk materials.

For the use according to the invention, the container according to the invention is conventionally produced, in general at the location where the bulk material according to the invention as defined here, including all embodiments, is produced, conventionally filled with this bulk material according to the invention, closed and then brought, conventionally by suitable means of transport such as trucks, railroad, ship, to its destination, where it may be emptied directly or emptied after a storage time. After emptying of the container according to the invention, the latter may be transported in a cleaned or uncleaned state by the conventional means of transport to its place of origin or a different location where, optionally after cleaning and/or other preparatory treatment, it may be refilled with the same bulk material or a different bulk material. These cycles may be repeated.

LIST OF REFERENCES (FIG. 1)

1 part of the container body
2 closure device (A), connection flange
3 closure device (A)
3A rotary valve
3B flat slide valve
3C iris diaphragm
4 mouth edge strip (flange)
5 seal
6 cover
7 cover edge strip (sealing compartment)
8 bayonet closure
9 outlet tube
10 clamping ring

The invention claimed is:

1. In an intermediate bulk container for holding bulk material, having a closable inlet for the bulk material in an upper closure of the container, a cross-sectional geometry narrowing in the outlet direction for the bulk material to comprise a narrowed outlet portion, an outlet tube for the bulk material arranged subsequently in the outlet direction, the improvement being in that the outlet tube being concentrically vertically aligned and axially communicating with the narrowed outlet portion, the outlet tube having a mouth, a first reversible mechanical closure device (A), which is arranged in the transition region from the narrowed outlet portion of the container body to the outlet tube or in the outlet tube itself and, by opening, releases the bulk material from the interior of the container into the outlet tube through the mouth of the outlet tube and by closing prevents release of the bulk material, and a second closure device (B) which reversibly closes the mouth of the outlet tube, the second closure device being a cover which is pressed flush onto the mouth of the outlet tube by means of a closing device, there being a seal on the cover which seals the outlet tube in a gas- and liquid-tight fashion from the external environment at least on the contact surface of the cover with the mouth of the outlet tube, wherein the cover is attached by the closing device which is a clamping ring or a bayonet closure onto the mouth of the outlet tube, wherein the cover has a convexly curved cover edge strip with the concavity of the cover edge strip receiving the seal, and a mouth edge of the outlet tube has a mouth edge strip, and the seal bears on the mouth edge strip in the connection of the cover to the mouth edge of the outlet tube, and the mouth edge strip and the seal and the cover and the cover edge strip and the closing device all being vertically aligned with the narrowed outlet portion.

2. The container according to claim 1, wherein the container has a cylindrical cross section and a conical geometry for the bulk material in the outlet direction.

3. The container according to claim 1, wherein the container is made of steel or aluminum.

4. The container according to claim 1, wherein the first reversible mechanical closure device (A) is/are one or more rotary valve(s) or iris diaphragm(s) or flat slide valve.

5. The container according to claim 1, wherein the seal is a resilient or deformable plastic.

6. The container according to claim 1, wherein the container has a total volume in the range of from 0.5 to 5 $m^3$.

7. The container according to claim 1, wherein the container is a multiuse container.

8. The container according to claim 1, wherein the container is a rigid intermediate bulk container.

9. The container according to claim 1, wherein the container is a flexible intermediate bulk container.

10. The container according to claim 1, wherein the container is mounted in a framework.

11. The container according to claim 1, in combination with bulk material in the container.

12. The combination according to claim 11, containing as the bulk material a material which is decomposed at least partly by the effect of oxygen and/or water, or the decomposition of which can be initiated by the effect of oxygen and/or water.

13. The combination according to claim 11, containing as the bulk material a salt of dithionous acid ($H_7S_2O_4$).

14. The combination according to claim 11, wherein the bulk material is a dangerous substance liable to spontaneous combustion of class 4 according to the Model Regulations of the UN Recommendations on the Transport of Dangerous Goods, Revision 18 (2013).

15. The container according to claim 11, wherein the bulk material has an average particle size in the range of from 0.01 to 10 mm, and the bulk material at least partly decomposes by the effect of oxygen.

16. The combination according to claim 11, wherein the bulk material is a salt of dithionous acid ($H_2S_2O_4$) or a composition which contains a salt of dithionous acid ($H_2S_2O_4$).

17. The combination according to claim 16, wherein the bulk material is sodium dithionite ($Na_2S_2O_4$) or a composition which contains sodium dithionite ($Na_2S_2O_4$).

\* \* \* \* \*